United States Patent [19]

Caporiccio et al.

[11] 3,876,617

[45] Apr. 8, 1974

[54] FLUORINE-CONTAINING ELASTOMERIC POLYAMIDES AND COPOLYAMIDES AND PROCESS FOR THEIR PREPARATION

[75] Inventors: Gerardo Caporiccio, Milan; Ezio Strepparola, Treviglio; Gianangelo Bargigia, Milan, all of Italy

[73] Assignee: Montecatini Edison S.p.A., Milan, Italy

[22] Filed: Apr. 25, 1973

[21] Appl. No.: 354,384

[30] Foreign Application Priority Data

Apr. 26, 1972  Italy.................................. 23548/72

[52] U.S. Cl. ... 260/47 CP; 260/31.8 N; 260/32.6 N; 260/37 N; 260/47 CZ; 260/49; 260/63 N; 260/65; 260/78 R; 260/78 A; 260/78 TF; 260/78 SC
[51] Int. Cl............................................. C08g 20/20
[58] Field of Search.......... 260/47 CZ, 47 CP, 78 R, 260/78 TF, 78 A, 65, 63 N, 78 SC, 49

[56] References Cited

UNITED STATES PATENTS

| 3,646,153 | 2/1972 | Oxenrider et al.................. 260/78 S |
| 3,660,315 | 5/1972 | Hill et al............................. 260/2 A |
| 3,729,449 | 4/1973 | Kimura et al...................... 260/78 R |

*Primary Examiner*—Lester L. Lee

[57] ABSTRACT

A new class of elastomeric polymers comprising in the macromolecular chain polyamide groups. The polymers can be cross-linked to form elastomers possessing excellent mechanical properties, high elasticity and flexibility at low temperature, and good thermal and chemical stability. The polyamides and copolyamides are prepared by polycondensation of polyoxaperfluoroalkandioic acids and diamines, optionally in the presence of multifunctional compounds. When multifunctional compounds are polycondensed, an amount of units from said compounds that is lower than 30% in number with respect to the bifunctional units is inserted.

13 Claims, No Drawings

FLUORINE-CONTAINING ELASTOMERIC POLYAMIDES AND COPOLYAMIDES AND PROCESS FOR THEIR PREPARATION

BACKGROUND OF THE INVENTION

FIELD OF THE INVENTION

The present invention relates to new polyamide and copolyamide products containing in their chain perfluoropolyether radicals having a linear structure, linked through carboxyamide groups to hydrocarbon radicals.

The present invention is also concerned with a process for preparing these polymeric products, this process comprising polycondensation of polyoxaperfluoroalkandioic acids with a diamine in the presence or not of a multifunctional compound.

SUMMARY OF THE INVENTION

We have discovered a new class of elastomeric polymers which can be cross-linked to form elastomers.

More particularly, the polymers of the present invention comprise polyoxafluorinated polyamides whose chain is made up of repeating units having the formula (1)

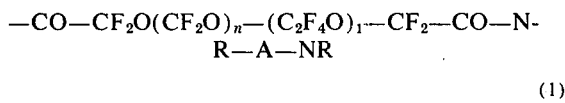

(1)

wherein $—C_2f^4—$ is a group obtained by opening of the double bond of one tetrafluoroethylene molecule; wherein $—C_2F_4O—$ and $—CF_2O—$ are oxyperfluoroalkylene units, which result to be contemporaneously present and randomly distributed along the chain; wherein indexes $n$ and $l$ are whole numbers from 2 to 100 and the sum $n + l$ is a number comprised between 5 and 200, preferably between 15 and 100, and the $l/n$ ratio is comprised between 0.2 and 1.5, wherein N is nitrogen; wherein A is a bivalent organic radical selected from the group comprising radicals deriving: (a) from aliphatic hydrocarbons, consisting of chains containing from 2 to 20 carbon atoms, preferably from 6 to 12 carbon atoms (optionally substituted in the main chain by alkyl groups), or (b) from alicyclic hydrocarbons consisting of 5 to 10 carbon atoms and optionally containing alkyl substituents groups, or (c) from heterocyclic compounds with the ring made up of 5 or 6 atoms and having aromatic nature, such as, for instance, triazole and triazine, or (d) from aromatic or alkyl aromatic hydrocarbons or from aromatic derivatives made up of 2 or more benzene rings either directly linked to one another or through a group consisting of one oxygen or sulphur atom or of a group such as $—CO—$, $SO—$, $—NH—$, $—SO_2—$, the alkylene group, the vinylene group; the benzene rings being optionally substituted by halogen atoms or by alkyl, phenyl, alkoxy, phenoxy groups or by other groups such as the haloalkyls, the nitrile, the nitrogroup, the vinyl or an alkenyl group, the carboxylic or sulphonic groups or their substitution derivatives; wherein R is selected from the group comprising hydrogen or an alkyl or phenyl radical.

These polyamides can be cross-linked to form elastomers which exhibit a range of useful properties, for instance, high elasticity and flexibility and good thermal and chemical stability, imparted by the polymeric chain blocks having the structure of perfluoropolyethers.

DESCRIPTION OF THE PREFERRED EMBODIMENTS

As regards the structure of the perfluoropolyether blocks constituting the repeating unit of formula (1), a minimum value of 5 of the sum ($n+1$) of ether units $—C_2F_4O—$ and $—CF_2O—$ is required in order to obta a polymeric material having elastomeric characteristics, either amorphous or containing low percentages of crystallinity.

When the value of the sum of units ($n+1$) is low, i.e. ranging from 5 to 15, the obtainment of a polymer of elastomeric character is conditioned by a proper choice of organic radical A and of group R, so as to prevent the formation of a polymer containing a too high percentage of crystallinity.

Such a result is obtained, for instance, with aliphatic amines such as hexamethylene diamine, N,N'-dimethylhexamethylenediamine, 2,4-toluene diamine.

When the value of the sum ($n+1$) is higher than 15, a polymer generally free from crystallinity is obtained, which exhibits an elastomeric nature and a high flexibility to very low temperatures, independently from the chemical structure of the diamine.

A suitable length of the perfluoropolyether group is required in order both for sufficiently spacing the amide groups from one another and to impart, at the same time, a very high rotational power to said perfluoropolyether segment.

In this way it is possible to prevent the generation of polar forces or of other secondary interactions of the intermolecular type, which generally originate undesired crystallinization phenomena besides a rise in the second order transition temperatures; upon increase of the perfluoropolyether block length, polyamides are obtained, which exhibit, beside an improved flexibility at low temperature, also a better thermal and chemical stability.

On the other hand it is necessary to include in the polymeric chain a proper number of diamine units linked to the perfluoropolyether blocks by carboxyamide groups.

The generation of the intermolecular cohesive forces, which limit the viscous creep of the linear chains of the polymer, thus imparting to it the desired characteristics of mechanical resistance, depends on said diamine units, as well as the possibility of obtaining intemolecular cross-linking bonds of ionic or covalent nature during the elastomer vulcanization; this can be achieved by suitably limiting the length of the perfluoropolyether blocks below the value corresponding to 200 ether units $—C_2F_4O—$ and $—CF_2O—$.

From the foregoing considerations, which have led to define the preferable length of the perfluoropolyether groups, it follows that another condition necessary to obtain polyamides having the described characteristics according to the invention, is a low polydispersity index of the mixtures of functional fluorinated polyethers which are used as one of the two classes of monomers. Such polydispersity index is defined by the $\bar{M}w/\bar{M}n$ ratio, wherein $\bar{M}w$ is the average weight molecular weight and $\bar{M}n$ is the average number molecular weight of the mixture (see P.J. Flory, "Polymer Chemistry" Ed. Cornell, New York, 1953, pages 273, 292). The preferable variability range of the ratio is comprised between 1 and 1.3.

Actually, the higher the polydispersity index of the mixture is, the higher the percentages of perfluoropolyether segments are, which have the molecular weight extreme values in the distribution range of the molecular weights.

Consequently, if fluorinated polyethers of lower molecular weight are present in a high percentage, they may bring about polyamide segments having a high content of amido polar groups. They are capable of causing the separation of undesired crystal phases in the polymer and a reduction in the low temperature flexibility, while the fluorinated polyethers fractions having a higher molecular weight may bring about the formation of polyamide segments, whose too low content of units derived from the diamines, beside worsening the mechanical properties of the polymer, makes it difficult for the cross-linking reactions to take place during the polymer vulcanization step.

Another structural characteristic of the perfluoropolyether blocks, which conditions the properties of the claimed elastomers, consists in the $1/n$ ratio between ether units $-C_2F_4O-$ and $-CF_2O-$: to obtain elastomers having a high flexibility at low temperatures it is advisable to use perfluoropolyether groups characterized by a $C_2F_4O/CF_2O$ ratio selected in the range from 0.2 to 1.5, preferably from 0.3 to 1.2.

The perfluoropolyether blocks constituting the repeating unit represented by formula (1) derive from the polyoxaperfluoroalkandioic acids of formula (2)

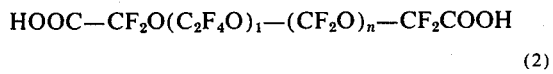

(2)

the process for obtaining same being described in Italian Pat. No. 817,809. The functionality degree of the acids is comprised between 1.4 and 1.999 in relation to a certain content of monofunctional acids having neutral terminal groups of the $-OCF_3$ and $-OCF_2Cl$ type.

It is well known how the polymerization degree of the polymers can be affected by the functionality degree: therefore, with a view to obtaining polymers having the best molecular weight, it is necessary not only to reach, for example, the highest conversion degrees by conducting the polycondensation very slowly and at high reaction temperatures, but also to start from monomers having the highest bifunctionality degree.

The best way to carry out the polycondensation consists in reacting the diamines with the perfluoropolyether acids either in the form of methyl or phenyl diesters or in the form of acyl chlorides; such methyl esters being directly obtainable according to any of the methods described in Italian patent No. 817,809. As shown in the Italian patent, the perfluorinated ether polymers and mixtures thereof having chemically reactive terminal groups at both ends of the chain are obtained by reacting a reducing agent, at a temperature of from about $-30°$ to $250°C$, under a pressure between about 1 and 200 atmospheres, in the presence or absence of a solvent or a dispersing agent, with a perfluorinated linear polyether containing peroxidic oxygen bridges, or with a mixture of such polyethers.

Examples of diamines used as monomers, which fall within the scope of this invention, are: 1,2-ethane diamine; 1,3-propane diamine; 1,4-butane diamine; 1,5-pentane diamine; 1,6-hexane diamine; 1,12-dodecane diamine; N,N'-dimethyl-1,6-hexane diamine; 1,3-benzene diamine; 1,4-benzene diamine; 2-chloro-1,4-benzene diamine; 2,6-dichloro-1,4-benzene diamine; 2-nitro-1,4-benzene diamine; 6-methoxy-1,3-benzene diamine; 6-chloro-1,3-benzene diamine; 2,4-toluene diamine; 2,6-toluene diamine; benzidine; 3,3'-dimethylbenzidine; 3,3'-dichlorobenzidine; 4,4'-oxydianiline; 4,4'-methylene-bis-(2-chloroaniline); 4,4'-methylene dianiline; 4,4'-sulphonyldianiline; 4,4'-sulphinyldianiline; 3,3'-sulphonyldianiline; 3,5-diaminobenzoic acid; 4,4'-ethylenedianiline; 3,5-diamino-1,2,4-triazole; 6-phenyl-2,4-diamino-1,3,5-triazine; 4,4'-diamino-benzophenone; 1,3-xylene-$\alpha,\alpha'$-diamine; 1-amino-3-amino-methyl-3,5,5-trimethylcyclohexane; 1,4-bis-(amino-methyl)-cyclohexane; 4,4'-phenylenedioxydianiline; 4,4'-iminodianiline.

The acyl chlorides and the phenyl esters are obtained from the free acids according to well-known processes described in Italian Pat. No. 817,809. From the foregoing, the process for preparing the elastomeric diamides according to the present invention is characterized in that the above defined diamines are reacted with the polyoxaperfluoroalkandioic acids having the formula

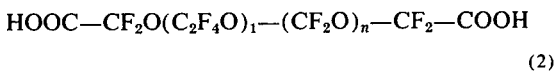

(2)

in the form of methyl or phenyl diesters or in the form of their acyl chlorides, at a temperature ranging from the room temperature to $280°C$, preferably from $20°$ to $250°C$.

The polycondensation starting from the polyoxafluoroalkandioic acids in the form of methyl or phenyl acids may be carried out in the absence or presence of organic solvents and/or of dispersing agent such as 1,1,-2-trichlorotrifluoroethane, perfluoropropylpyran, benzene, methanol, tetrahydrofuran, dioxane, N,N-dimethylformamide, aromatic hydrocarbons, and their alkyl or halogen derivatives; during the polycondensation it is necessary to remove the alcohols formed in the reaction, and, as regards phenol, the best procedure to remove it consists in carrying out the polymerization at high temperature, in the presence of solvents capable of forming azeotropic mixtures with phenol, such as, for instance: chlorotoluenes, orthodichlorobenzene, mesitylene, cymene and cumene.

The temperature necessary to attain the high conversion degree required may reach $280°C$, the preferred reaction range being comprised between $20°$ and $250°C$.

The synthesis of the polyamides starting from the chlorides of the polyoxaperfluoroalkandioic acids can be obtained by reacting said bicarboxylic acid chlorides with the diamines either in a solution of mixtures of organic solvents, such as N,N-dimethylformamide, N,N-dimethylacetamide, with 1,1,2-trichlorotrifluoroethane, and in the presence or not of compounds of basic nature such as the nitrogen tertiary bases or an excess of said diamine, or by means of the interface technique in an aqueous-organic medium, in such case the preferred organic solvent being 1,1,2-trichlorotrifluoroethane and the diamine excess being suitably used as acids acceptor.

The cross-linking of the polyamides described can be brought about by the action of organic peroxides, such as, for example, dicumyl peroxide or diterbutylperoxydiisopropylbenzene, at temperatures ranging from $70°$ to $200°C$.

Also the polymers, in whose chains monomeric units with more than two funtions are inserted, the further functions being selected from the group including, for example, a double bond, a carboxylic or sulphonic or hydroxy group, or an amino or alkylamino group,-fall within the scope of this invention.

The insertion of such units in the polymeric chain, generally to an extent up to 30% in number with respect to the bifunctional units, aims at forming reactive points, which are useful to the cross-linking of the polymeric material. The cross-linking can be brought about by bonds of covalent or ionic nature, either during the polycondensation or, partly or thoroughly, in a subsequent step; in the latter case the cross-linking occurs by addition of suitable reactants; such as organic peroxides or bifunctional organic compounds of acid or basic nature or oxides or salts of electropositive metals.

Examples of multifunctional monomeric units falling within the scope of the present invention are: fumaric acid esters; 3,5-diaminobenzoic, 3,5-diaminosulphonic, pyromellitic, trimellitic, benzophenonetetracarboxylic acids; 1,3,5-benzenetriamine; 4,4'-stilbendiamine; cyclohexenylendicarboxylic acid.

EXAMPLE 1

An elastomeric polyamide has been prepared by synthesis starting from a mixture of functional fluorinated polyethers having as chain terminals carboxylic groups (methylesters) with a structure corresponding to formula (2), a ratio between ether units $C_2F_4O/CF_2O$ equal to 0.9, a functionality degree determined by NMR analysis equal to 1.95, an equivalent weight of 840, determined by alkaline saponification and alkalimetric titration, and a $\bar{M}w/\bar{M}n$ polydispersity index of 1.15, corresponding to a high homogeneity of the diesters mixture made up of components with an equivalent weight ranging from 520 to 1200.

Such fraction had been obtained from a mixture having a wider distribution range of the components, by separating the lighter components by means of distillation under vacuum, and the heavier components by means of fractional precipitation with $CH_2Cl_2$ from a solution in 1, 1, 2-trichlorotrifluoroethane.

A 4-neck glass flask having a 500 cm³ capacity, provided with stirrer, dropping funnel, reflux condenser and thermometer well, kept in a dry nitrogen atmosphere was fed with 101.6 g of the diesters mixture having an equivalent weight of 840; after addition of 100 ml of 1,1,2-trichlorotrifluoroethane the mixture was thermoregulated at 20°C. Maintaining an intense stirring into the flask, a solution of 7.02 g of disublimated hexamethylenediamine in 25 ml of anhydrous benzene was added to the solution within 15 minutes. During the addition of diamine, a viscous polymeric phase separated and once the addition was ended, the temperature was brought to 40°C and the mass was reacted for 2 hours under stirring.

The stirrer was removed from the flask, the dropping funnel was replaced by a Liebig's condenser connected to a 250 ml flask cooled down to −20°C for the collection of the condensate, and the solvents were evaporated in two hours from the prepolymer mixture kept at about 60°C under a 20 mm Hg vacuum.

The condensate collecting flask was then replaced by a 100 ml test-tube, cooled down to − 78°C; a glass capillary tube provided with a cock and connected to the dry nitrogen was introduced into the reaction flask and, after having connected the apparatus to a mechanical pump capable of creating a 1 mm Hg vacuum, the temperature in the reaction flask was raised up to 210°C at a rate of 12°C/hour, maintaining a dry nitrogen slow bubble in the flask, then the reaction was kept at 210°C for 2 hours.

A mass of an amorphous, viscous, rubber-like polymer, soluble in hexafluorobutyric acid or mixtures of 1,1,2-trichlorotrifluoroethane with methanol or with N,N-dimethylformamide at 70–80% by volume of fluorinated solvent, was thus obtained.

In a 0.3% solution of the polyamide in the 1,1,2-trichlorotrifluoroethane/N,N-dimethylformamide mixture (4/1 by volume), at 20°C, an inherent viscosity value equal to 0.7 dl/g was determined, which is defined by the relation $\eta_{inher.} = 1/C \ln t/t_o$, wherein C is the dissolved product concentration expressed in g/dl and $t_o$ and $t$ are the flowing times of equal volumes of solvent and of solution in the capillary tube of a viscosimeter of the Desreux Bishoff type.

A polymer sample subjected to the thermogravimetric analysis, carried out under a thermoanalyzer Du Pont 900, at a heating rate of 10°C/min., exhibited a thermal decomposition threshold in nitrogen (conventionally defined by a loss $\Delta P/P\% = -2$) at a temperature of 370°C, and in air at a temperature of 320°C. On calorimetric differential analysis the polymer resulted throughly amorphous and exhibited a second order transistion temperature of −104°C.

A sample of a mixture consisting of the polymer (100 parts), mixed on a calender with MT carbon black (20 parts) and with dicumylperoxide filled with 60% of $CaCO_3$ (15 parts), was vulcanized by keeping it between the plates of a Carver press at a temperature of 160°C for 90 minutes under a 5 tons load, and then by keeping it at 160°C in an oven for further 2 hours.

On test samples of the thus filled and vulcanized material, cut according to standards ASTM D 412-41 and subjected to a tension test by a dynamometer of the Amsler 0.2 ZH 118 type, a tensile strength of 65 kg/cm², an elongation at break of 500%, a modulus a 300% of 50 kg/cm² were determined at 23°C.

On other samples of vulcanized material, a hardness (I.R.H.D.) of 40 degree and a compression set of 30% after compression at 100°C for 70 hours, were determined.

Samples of the elastomer filled and vulcanized as described hereinbefore exhibited, after a 7-day immersion in solvents at 25°C, a swelling ($\Delta V/V\%$) in benzene equal to +1%; in heptane = + 0.4%; in 1,1,2-trichlorotrifluoroethane = +2%; in methanol = +1%; in $H_2SO_4$ (at 98%) = −2%; in NaOH (at 20%) : nil; in Fomblin oil type YO = −1%; in methylethylketone = +25%; in ethyl acetate = +35%.

EXAMPLE 2

The polyamide described in this example has been obtained starting from a mixture of methyl diesters of polyoxaperfluoroalkandioic acids having an equivalent weight comprised in the range from 700 to 1750 and an average equivalent weight of the mixture equal to 1235, a polydispersity index $\bar{M}w/\bar{M}n$ equal to 1.2; the mixture had a functionality degree of 1.94 and a ratio between the $C_2F_4O/CF_2O$ ether units equal to 0.8, a determined by NMR spectroscopy.

352 g of a perfluoropolyether diesters mixture and 140 ml of 1,1,2-trichlorotrifluoroethane were intro duced into a 4-neck pyrex glass reactor provided with stirrer, reflux condenser, dropping funnel and thermometer well, having a 1 liter capacity, immersed in a thermostatic bath. The mixture was thermoregulated under stirring at 40°C and 40 ml of a methanol solution containing 16.53 g of disublimated hexamethylenediamine were made to drop thereinto from the dropping funnel.

The whole was reacted under stirring for 30 minutes and the reflux condenser was then replaced by a Liebig condenser connected to a flask cooled down to $-20°C$; subsequently the solvents were distilled from the mixture under a pressure ranging from 20 mm to 2 mm Hg, keeping the reactor at a temperature rising from 60° to 100°C.

The polymer was dissolved in 3 l of a 1,1,2-trichlorotrifluoroethane - methanol (85:15 by volume) mixture and precipitated with an equal volume of methanol; the polymer separated by decantation from methanol and was dried under vacuum at 100°C.

The polymer was transferred into a 750 ml mixer of the Beken-Duplex type, made of stainless steel and furnished with 4 self-scraping blades, an oil jacket and a cover provided with 2 valves for the gas circulation.

One valve was connected to the vacuum line, and by means of the other valve, which was connected to a nitrogen line, an absolute pressure of 2 mm Hg was kept in the reactor.

The stirrer was started and warm oil, thermoregulated so as the jacket temperature was raised from 100° to 150°C in 2 hours, was made to circulate in the jacket.

The reaction was carried out for further 7 hours at 150°C.

A 300 g sample of the crude polymer thus obtained was dissolved in 6 l of a dissolving mixture consisting of 1,1,2-trichlorotrifluoroethane-methanol (85:15 by volume) and precipitated in fractions with methanol. The first 4 precipitated fractions were collected together, thus obtaining, after evaporation of the solvents at 150°C under 1 mm Hg vacuum, 145 g of a polymer having an inherent viscosity of 0.6 dl/g determined at 20°C in a 0.5% solution in trichlorotrifluoroethane -N,N-dimethylformamide (8:2 by volume).

On polymer samples having an inherent viscosity of 0.6 dl/g, a thermal decomposition threshold in nitrogen of 390°C (corresponding to a $\Delta P/P\% = -2$, heating rate = 10°C/min.) and in air of 315°C (heating rate = 0.6°C/min.) was determined by thermogravimetry; a second order transition temperature of $-110°C$ was detected by means of the differential calorimetric analysis, while no first order transition phenomena were observed.

A mixture made up of the polyamide (100 parts), of MT carbon black (20 parts), of di-terbutylperoxydiisopropylbenzene (5 parts) was prepared; some samples of such mixture were vulcanized by keeping them at first in a press under a 5 tons load, at a temperature of 160°C for 90 minutes, and then in an oven at 160°C for further 2 hours. On laminates samples of the vulcanized polymer, subjected to a tension test, a tensile strength of 55 kg/cm² and an elongation at break of 600% were determined.

EXAMPLE 3

This example illustrates the synthesis and characterization of the polyamide of the hexamethylenediamine obtained from a mixture of methyl diesters, having an equivalent weight comprised between 620 and 1600, characterized by a polidispersity index of 1.19 and by an average equivalent weight of 1250, as determined by alkaline saponification and alkalimetric titration.

On a NMR spectroscopic analysis the mixture revealed a functionality degree equal to 1.98 and a ratio between the $C_2F_4O/CF_2O$ ether units equal to 0.6.

181.4 g of a mixture of perfluoropolyether diesters and 70 ml of 1,1,2-trichlorotrifluoroethane were fed into a four-neck pyrex glass reactor having a capacity of 500 ml, provided with stirrer, dropping funnel, reflux condenser and thermometer well; subsequently, after having mixed the mixture at 40°C, 20 ml of a methanol solution containing in solution 8.38 g of disublimated hexamethylenediamine were introduced thereinto by means of the dropping funnel.

Reaction was conducted at 40°C under stirring for 30 minutes, then, after having replaced the dropping funnel with a nitrogen feeding pipe and the reflux condenser with a Liebig condenser, which was connected, in its turn, to the collection tank cooled down to $-20°C$, the solvents were evaporated by gradually raising the temperature in the reaction flask from 60° to 100°C, while the vacuum was adjusted so as to keep an absolute pressure of 5 mm Hg of nitrogen.

When the mass consisting of dispersing solvents was exhausted, both vacuum and nitrogen feeding were adjusted, so as to reduce the inside pressure to 1 mm Hg, and the flask temperature was brought from 100° to 240°C in 4 hours, the reaction being conducted for further 2 hours at 240°C.

A polymer having an inherent viscosity of 0.8 dl/g, determined in a 0.5% solution in a mixture of 1,1,2-trichlorotrifluoroethane -N,N-dimethyl-formamide (8:2, by volume) was thus obtained.

On a differential calorimetric analysis the polymer samples revealed a second order transition phenomenon at a temperature of $-120°C$, while no first order transition phenomena could be noticed.

EXAMPLE 4

The polyamide described in this example has been obtained by synthesis starting from a mixture of methyl esters of polyoxaperfluoroalkandioic acids having equivalent weights (determined by saponification and alkalimetric titration) comprised in the range from 2400 to 3300 and corrisponding to an average value of 2875, with a $\overline{M}w/\overline{M}n$ polydispersity index of 1.3.

The esters were characterized by a functionality degree of 1.85 and by a ratio between the $C_2F_4O/CF_2O$ ether units of 0.9, as determined on a NMR analysis.

313.5 g of methyl diester and 150 ml of perfluoropropylpyran were fed into a reactor of the type described in example 2. The reactor was thermoregulated at 25°C and by means of the dropping funnel 50 cc of a benzene solution containing 6.31 g of hexamethylenediamine were admixed in 10'. Reaction was conducted for 2 hours at 60°C, and, after cooling, the mixture of solvents was siphoned by decanting three times with 200 ml of 1,1,2-trichlorotrifluoroethane; finally the solvent was removed under a 5 mm Hg vacuum, keeping the reactor thermoregulated at 100°C.

The polymer was then heated, under vacuum and a nitrogen flow in order to keep an absolute pressure of 2 mm Hg, by raising the temperature from 100° to 220°C in 1 hour and by maintaining such temperature for 2 hours.

An amorphous product of elastomeric nature was thus obtained, having an inherent viscosity of 0.4 dl/g at 20°C, determined in a 0.5% solution in a 1,1,2-trichlorotrifluoroethane - methanol mixture (9:1, by volume).

On polymer samples a threshold of thermal decomposition in nitrogen of about 390°C ($\Delta P/P\% = -2$; 10°C/min.) was determined by thermogravimetry, while only a second order transition temperature of $-125°C$ was detected by means of a differential calorimetric analysis.

From a sample of a mixture containing the polyamide (100 parts), MT carbon black (30 parts), di-terbutyl peroxy-diisopropylbenzene (5 parts), vulcanized at first on a press and then in an oven under the same conditions as described in example 3, it was possible to obtain elastomeric laminas characterized by a tensile strength of approx. 30 kg/cm$^2$ and by an elongation at break of 800%.

EXAMPLE 5

The polyamide described in this example has been obtained from a mixture of dimethyl diesters having an equivalent weight comprised between 3500 and 4400 with an average value of 4100; the mixture of diesters subjected to NMR spectroscopy was characterized by a functionality degree of 1.7 and by an ether units ratio $C_2F_4O/CF_2O$ equal to 0.95. 33.9 g of the abovesaid mixture and 50 ml of 1-fluoro-1,2-dichloroethane were fed into a 3-neck pyrex glass reactor of 250 ml capacity, provided with reflux condenser, stirrer and dropping funnel. The reactor was thermo-regulated at 25°C under solution stirring, and 5 ml of a benzene solution containing 0.48 g of hexamethylenediamine were then admixed in 10 minutes by means of the dropping funnel.

Polymerization was continued for 2 hours at a temperature of 70°C.

Subsequently the solvents were removed by distillation under a vacuum of 5 mm Hg at 100°C; then, keeping a flowing nitrogen absolute pressure of 5 mm Hg, polymerization was carried on by raising the temperature from 100° to 220°C in 1 hour and by keeping such temperature for further 2 hours.

When the polymerization had ended, a polymer in the liquid state, very viscous and soluble in 1,1,2-trichlorotrifluoroethane was obtained which, on a calorimetric analysis, revealed only a second order transition temperature of $-128°C$; in a 1% solution of the polymer in 1,1,2-trifluorotrichloroethane an inherent viscosity of 0.3 dl/g at 20°C was determined.

EXAMPLE 6

The polyamide described in this example has been obtained starting from the perfluoropolyether diesters mixture already described in example 3.

A pyrex glass 4-neck reactor provided with stirrer, reflux condenser, thermometer and dropping funnel, thermoregulated at 25°C, was fed with 90.4 g of the diesters mixture and with 60 ml of 1,1,2-trichlorotrifluoroethane; 60 ml of a methanol solution containing 7.23 g of disublimated dodecane diamine were added in 10' by means of the dropping funnel to the mixture kept under stirring.

The reaction was conducted at 25°C for 2 hours and then at 40°C for further 2 hours. The solvents were evaporated in the same way as already described, keeping the polymer at 100°C for 5 hours at a flowing nitrogen absolute pressure of 5 mm Hg, then, bringing the flowing nitrogen stream to a 2 mm Hg absolute pressure, the polymerization was carried on by raising the temperature from 100° to 220°C in 1 hour.

The polymer was dissolved in 1 liter of a trichlorotrifluoroethane - methanol mixture (9:1, by volume) and was precipitated with an equal volume of methanol; the polymer was separated and the solvent was evaporated once again under a 20 mm Hg vacuum at 100°C; then the polymer was kept for further 2 hours at 220°C under a nitrogen flow at an absolute pressure of 2 mm Hg.

The product thus formed exhibited an inherent viscosity of 0.9 dl/g determined at 20°C in a 0.3% solution in 1,1,2-trifluorotrichloroethane - methanol (9:1, by volume).

On polymer samples, a threshold of thermal decomposition in nitrogen corresponding to 389°C ($\Delta P/P \% = -2$; 10°C/min.) was determined by thermogravimetry, and only a second order transition temperature of $-118°C$ was determined by differential calorimetric analysis.

A mixture consisting of the polymer obtained as described hereinbefore (100 parts), of di-terbutylperoxy-diisopropylbenzene (4 parts), of Mt carbon black (20 parts) was prepared by calendering; samples of such mixture were vulcanized at 160°C for 90 minutes on a press under a 5 tons load; subsequently, after having allowed the laminas to cool down under load, they were placed into an oven and left there at 160°C for further 2 hours. On samples obtained from the laminas and subjected to tension test the following values were measured: tensile strength $= 70$ kg/cm$^2$; elongation at break $= 350\%$; modulus at 300% corresponding to 60 kg/cm$^2$.

EXAMPLE 7

This example describes the synthesis and characterization of the polyamide of 1,4(bisaminomethyl)cyclohexane starting from the mixture of perfluoropolyether diesters of example 1.

54.9 g of the diesters mixture and 50 ml of 1-fluoro-1,2-dichlorethane were fed into a 3-neck glass flask of 250 ml capacity, provided with reflux condenser, stirrer and dropping funnel, thermoregulated at 25°C. To the solution thus obtained, 4.64 g of 1,4-(bis-aminomethyl)cyclohexane dissolved in 50 ml of benzene were added.

The reaction was conducted for 2 hours at 20°C and for further 2 hours at 70°C, then the solvents were made to distill by evaporation under a vacuum of 20 mm Hg at 100°C; subsequently, keeping the flask connected to the vacuum line and under a nitrogen flow at an absolute pressure of 2 mm Hg, the temperature of the reaction mixture was raised from 100° to 230°C in 1 hour, reaction being then conducted for further 2 hours at 230°C. The polymer thus obtained exhibited an elastomeric behaviour, on said polymer having been determined an inherent viscosity of 0.45 dl/g at 20°C in a 0.4% solution in hexafluorobutyric acid. On polymer samples a threshold of thermal decomposition in nitrogen corresponding to 360°C ($\Delta P/P \% = -2$, 10°C/min.) was determined by thermogravimetry, while only a second order transition phenomenon at approximately −100°C was determined by differential calorimetric analysis.

A polymer sample mixed on a calender with 5% of dicumylperoxide and 20% of silica of the Ultrasil VN3 type, vulcanized on a press at 160°C for 1 hour and treated in an oven for further 3 hours at the same temperature, yielded elastic laminas having a tensile strength of 45 kg/cm² and an elongation at break of 500%.

EXAMPLE 8

This example illustrates the synthesis and characterization of the polyamide of hexamethylenediamine obtained from the mixture of chlorides of the polyoxaperfluoroalkandioic acids having an average molecular weight of 1750.

Such acyl chlorides mixture has been obtained starting from methyl diesters having an average molecular weight of 1680, described in example 1, by hydrolysis of the esters and chlorination of the free acids with thionyl chloride, and by successive distillation.

The polydispersity range and index, as well as the functionality degree of the obtained acyl chlorides were corresponding to the values of the original diesters.

200 ml of an aqueous solution containing 3.5 g of hexamethylenediamine were introduced into a three-neck, pyrex glass flask, provided with 2 dropping funnels and a stirrer, thermoregulated at 20°C; while stirring the mixture, 75 ml of a solution of 1,1,2-trichlorotrifluoroethane containing 21 g of the chlorides of the perfluoropolyether acids were made to drop thereinto in 2 minutes.

The reaction was carried on at 20°C for 20 minutes, the polymer was washed by decantation with water, it was gathered and dried under a 20 mm Hg vacuum at 100°C.

The elastic polymer exhibited an inherent viscosity of 0.4 dl/g, as determined at 20°C in a 0.3% solution of a mixture of 1,1,2-trichlorotrifluoroethane and N,N-dimethylformamide (4:1 by volume).

EXAMPLE 9

This example illustrates the synthesis and characterization of the polyamide of the N,N'-dimethylhexamethylenediamine obtained from a mixture of the chlorides of the polyoxaperfluoroalkandioic acids having an average molecular weight of 1750, described in example 8.

The apparatus, technique and operating modalities were the same in example 8; 21 g of acyl chlorides dissolved in 75 ml of 1,1,2-trichlorotrifluoroethane were reacted with 4.35 g of diamine dissolved in 200 ml of water.

An amorphous, elastomeric polymer was thus obtained, having an inherent viscosity at 20°C of 0.25 dl/g, determined in a 0.6% solution of 1,1,2-trichlorotrifluoroethane -methanol (5:1 by volume), and a second order transition temperature of −119°C was determined by differential calorimetric analysis.

EXAMPLE 10

This example illustrates the synthesis and characterization of the polyamide of 2,4-toluene diamine obtained from a phenyl diesters mixture having equivalent weights comprised in the range from 450 to 950 and an average equivalent weight of 685, as determined by alkaline saponification and alkalimetric titration. The mixture was characterized by a $\bar{M}w/\bar{M}n$ polydispersity index of 1.2; the NMR spectroscopic analysis of the mixture revealed a functionality degree of 1.97 and a ratio between the $C_2F_4O/CF_2O$ ether units of 0.6.

111.7 g of perfluoropolyether phenyl diesters and 9.95 g of 2,4-toluenediamine were introduced into a 2-neck pyrex glass flask having a 250 ml capacity, provided with a lateral neck connected to a branched test tube of 100 ml capacity, in a dry nitrogen atmosphere, subsequently, by thermoregulating the reaction flask at 100°C, diamine was molten, thus obtaining a homogeneous reaction mixture. The mixture, reacted for 2 hours at 100°C and at atmospheric pressure, yielded, after cooling, a viscous liquid.

By creating a dynamic vacuum of 1 mm Hg, reaction was carried out under these conditions at 140°C for 3 hours, thus attaining a further viscosity increase. The polymer was transferred into a cylindrical flask having a diameter of 40 mm and a height of 200 mm, provided with a fritted glass bottom wherefrom, by means of a glass U-tube, nitrogen was conveyed while vacuum was created at the cylinder top of the flask. The reactor was vertically plunged into a thermoregulated bath which was conditioned in such way as to raise the temperature from 140° to 280°C in 2 hours, nitrogen was made to bubble into the molten polymer mass, the gas flow being regulated so as to keep an absolute pressure of 2 mm Hg.

The polymer thus obtained appeared, after cooling, as a product having elastomeric properties, soluble in mixtures of 1,1,2-trichlorotrifluoroethane with methanol or N,N-dimethylformamide or hexafluoroxylene, at 80% of fluorinated solvent.

In a polymer solution at 0.3% in a mixture of 1,1,2-trichlorotrifluoroethane- N,N-dimethylformamide (8:2 by volume), an inherent viscosity value of 0.6 dl/g was determined at 20°C.

Polymer samples examined by means of thermogravimetry exhibited a threshold of thermal degradation in nitrogen ($\Delta P/P \% = -2$; 10°C/min.) of 350°C, said threshold in air was of 340°C; a thermogravimetric analysis at 200°C in an air atmosphere revealed that during 24 hours the polymer neither suffered any weight loss nor exhibited any variation in the molecular weight.

A differential calorimetric analysis revealed in the product a second order transition phenomenon at −100°C, as well as a very slight phenomenon of first order transition in the zone at −60°C.

By calendering a polymer sample (100 parts) with MT carbon black (20 parts) and bis-terbutylperoxydiisopropylbenzene (5 parts) a mixture was obtained which, by vulcanization on a press under a 5 tons load at 160°C for 90 minutes, yielded laminas having excellent elastic properties, characterized by a tensile strength of 120 kg/cm², a 300% modulus of 100 kg/cm² and an elongation at break of 400%.

EXAMPLE 11

The polyamide described in this example has been obtained from a mixture of phenyl diesters having an equivalent weight comprised between 800 and 1600 and an average equivalent weight of 1300, determined by alkaline saponification and alkalimetric titration.

The mixture was characterized by a $\bar{M}w/\bar{M}n$ polydispersity index of 1.25; a NMR spectroscopic analysis revealed a functionality degree of 1.95 and a ratio between the $C_2F_4O/CF_2O$ ether units of 0.6.

By using the same apparatus and following the same polymerization technique of example 10, a polymerization test was carried out by polycondensing 133.5 g of the diesters mixture with 6.26 g of 2,4-toluenediamine.

A polyamide was thus obtained exhibiting an elastomeric nature and an inherent viscosity of 0.5 dl/g, determined at 20°C in a 0.3% solution in 1,1,2-trichlorotrifluoroethane-N,N-dimethylformamide (9:1 by volume). On differential calorimetric analysis the polymer exhibited a second order transition temperature of −117°C, without revealing, however, any first order transition phenomena.

On thermogravimetric analysis the polymer samples exhibited a thermal decomposition threshold at 360°C.

By subjecting to vulcanization on a press a mixture obtained from the polymer (100 parts) filled with MT carbon black (20 parts) and with bis-terbutylperoxy-diisopropylbenzene (5 parts), after a residence time of 90 minutes at 160°C under a 5 tons load, very elastic laminas were obtained, having a tensile strength of 60 kg/cm² and an elongation at break of 600%. Samples of laminas filled and vulcanized as described hereinbefore, after immersion in solvents at 25°C for 7 days exhibited in benzene a swelling of 2% ($\Delta$ V/V %), in methylethylketone of 14%, in ethyl acetate and tetrahydrofuran of 17-18%, in 1,1,2-trichlorotrifluoroethane of 5%, in heptane of 0.5%.

EXAMPLE 12

The present example illustrates the synthesis and characterization of the polyamide of 3,3'-dichloro-4,4'-diaminodiphenyl, obtained from the phenyl diesters mixture described in example 11, having an equivalent weight of 1300.

14.48 g of phenyl diesters mixture and 1.41 g of 3,3'-dichloro-4,4'-diaminodiphenyl were introduced under a nitrogen atmosphere into a two-neck glass flask of 100 ml capacity, immersed in a thermostatic bath and connected by means of a lateral neck to a branched test tube.

The temperature was brought to 140°C in 3 hours, then the homogeneous mixture was further treated for 1 hour at 140°C, finally the condensation test tube was cooled down to −80°C and a 2 mm Hg vacuum was created therein while continuing to react at 140°C for 3 hours. Keeping the abovesaid vacuum, the temperature was raised to 220°C in 30 minutes and the reaction carried on for further 3 hours. The polymer of elastomeric nature thus obtained exhibited an inherent viscosity of 0.4 dl/g, determined at 20°C in a 0.6% solution in a mixture of 1,1,2-trichlorotrifluoroethane-N,N-dimethylformamide (9:1 by volume); on a differential calorimetric analysis the polymer samples revealed only a second order transition temperature of −118°C.

The thermal decomposition threshold of the polymer in nitrogen, determined at a heating ratio of 10°C/min., resulted to be of 370°C ($\Delta$ P/P % = −2).

EXAMPLE 13

This example illustrates the synthesis of the polyamide of 3,3'-dichloro-4,4'-diaminodiphenylmethane with the phenyl diesters mixture having an average equivalent weight of 1300, as described in example 11. Technique, apparatus and polycondensation conditions were the same as described in example 12.

16.66 g of the phenyl diesters mixture and 1.71 g of diamine were reacted. A solid, amorphous polymer of elastomeric nature, not thoroughly soluble in 1,1,2-trichlorotrifluoroethane or in mixtures thereof with methanol and N,N-dimethylformamide was thus obtained. On differential calorimetric analysis the polymer samples revealed a second order transition temperature of −116°C.

On thermogravimetric analysis the polymer exhibited a degradation threshold ($\Delta$ P/P % = −2) at about 375°C in nitrogen.

A calorimetric analysis carried out on the polymer samples filled with MT carbon black (20%) and with dicumylperoxide (5%) and vulcanized by heating at 160°C for 90' did not reveal any first order transition phenomenon.

EXAMPLE 14

This example illustrates the synthesis of the polyamide of 3,3'-dimethyl-4,4'-diaminodiphenyl obtained from the mixture of phenyl diesters having an average equivalent weight of 1300, described in example 11. The apparatus, technique and polycondensation conditions were the same as described in examples 12 and 13.

19 g of phenyl diesters and 1.55 g of diamine have been reacted and an elastomeric product has been obtained, which exhibited an inherent viscosity of 0.35 dl/g, as determined at 20°C in a 0.6% solution in 1,1,2-trichlorotrifluoroethane-N,N-dimethylformamide (9:1 by volume). On differential calorimetric analysis the polymer revealed a second order transition temperature of −119°C and a very slight first order transition phenomenon around 0°C.

EXAMPLE 15

This example illustrates the synthesis and characterization of the polyamide of 1,3-benzenediamine obtained from the mixture of phenyl diesters having an equivalent average weight of 1300, described in example 11.

The apparatus, technique and polycondensation conditions were the same as described in examples 12, 13 14.

22 g of phenyl diesters and 0.92 g of m-phenylendiamine have been reacted and a polymer has been obtained having elastomeric properties and characterized by an inherent viscosity of 0.35 dl/g at 20°C determined in a 0.6% solution in a mixture of 1,1,2-trichlorotrifluoroethane-N,N-dimethylformamide (9:1 by volume).

On differential calorimetric analysis the polymer revealed a second order transition phenomenon a −117°C and a first order slight transition phenomenon around 0°C.

A polyamide sample (10 parts) filled with MT carbon black (2 parts) and with di-terbutylperoxy-diisopropyl benzene (0.5 parts), vulcanized on a press at 160°C for 90 minutes, yielded elastomer laminas having a tensile strength of 60 kg/cm² and an elongation at break of 250%.

EXAMPLE 16

The polyamide of this example has been obtained starting from the mixture of phenyl perfluoropolyether diesters described in example 10, characterized by an average equivalent of 685.

21.32 g of phenyl diesters and 1.9 g of 2,4-diaminotoluene and 50 ml of mesitylene were introduced under a dry nitrogen atmosphere into a three-neck glass flask of 100 ml capacity, immersed in a thermostatic bath, provided with dropping funnel, Liebig condenser connected to a 300 ml branched test tube, and nitrogen inlet pipe.

The thermostatic bath temperature was brought to 140°C in 1 hour and the mixture was reacted at such temperature for 4 hours.

The bath temperature was then raised until a mixture of mesitylene (boiling point: 164.6°C) and of its azeotrope with phenol (boiling point: 163.5°C) began to distill from the reaction flask at 165°C.

The reaction was carried on for 4 hours going on introducing fresh mesitylene into the flask by means of a dropping funnel until the presence of phenol in the distillate became detectable (by gas-chromatography on a column consisting of a stationary phase of silicone oil 550 carried on chromosorb). The solvent was evaporated from the polymer by distillation under hard vacuum at a temperature of 100°C, thus obtaining a polymer like the one described in example 8, having an inherent viscosity of 0.4 dl/g, determined at 20°C in a 0.6% solution in a mixture of 1,1,2-trichlorotrifluoroethane-N,N-dimethylformamide (4:1 by volume).

EXAMPLE 17

The polymer described in this example has been obtained from a mixture of phenyl perfluoropolyether diesters having an average equivalent weight of 685, which has been utilized for the preparation according to example 10. Into a 100 ml glass flask, provided with a side arm and connected to a 100 ml test tube completed with a lateral cock, 31.2 g of phenyl diesters, 2.92 g of 2,4-toluenediamine and 0.31 g of phenyl fumarates were introduced at room temperature and in a nitrogen atmosphere; the reaction flask was dipped into a thermostatic bath at 170°C and a liquid homogeneous mixture was thus obtained. Reaction was carried on at 170°C for 4 hours at atmospheric pressure; the reactor was then connected to the vacuum line and, by suitably adjusting the nitrogen inlet, a 5 mm Hg absolute pressure was maintained, while the temperature was kept at 170°C for further 3 hours and then raised to 260°C in 1 hour. After cooling, an amorphous, elastomeric polymer was obtained, having an inherent viscosity of 0.4 dl/g, as measured in a 0.6% solution in a mixture of 1,1,2-trichlorotrifluoroethane -N,N-dimethylformamide (4:1 by volume.)

A polymer sample (100 parts) was filled with MT carbon black (20 parts) and with dicumylperoxide (5 parts) and was vulcanized on a press under the usual conditions at 150°C for 1 hour, thus yielding polymer laminas exhibiting a tensile strength of 90 kg/cm$^2$ and a 200% elongation at break. A thermal decomposition threshold in air at 350°C ($\Delta$ P/P % = −2) was determined on samples of vulcanized polymer by means of a thermogravimetric analysis.

What we claim is:

1. An elastomeric polymer, the macromolecular perfluoropolyether and polyamide chain of which is made up of a repeating unit:

$$-COCF_2O(CF_2O)_n-(C_2F_4O)_m-CF_2-CO-N-R-A-NR-$$

wherein $-C_2F_4-$ is a group resulting from the opening of the double bond of one tetrafluoroethylene molecule, $-C_2F_4O-$ and $-CF_2O-$ are oxyperfluoroalkylene units radomly distributed along the chain in a ratio of from 0.2 to 1.5, $n$ and $m$ are whole numbers from 2 to 100, the sum $n + m$ is a whole number from 5 to 200, N is nitrogen, A is a bivalent organic radical selected from the group consisting of (a) radicals from aliphatic hydrocarbons, the chains of which contain from 2 to 20 carbon atoms; (b) radicals from alicyclic hydrocarbons containing from 5 to 10 carbon atoms and optionally containing alkyl groups; (c) radicals from heterocyclic compounds selected from the group consisting of 3,5-diamino-1,2,4-triazole and 6-phenyl-2,4-diamino-1,3,5-triazine; and (d) radicals from aromatic or alkyl-aromatic hydrocarbons, or aromatic derivatives consisting of 2 or more benzene rings either directly bound to one another or through a group made up of $-NH-$, $-CO-$, $-SO-$, $-SO_2-$, an alkylene or a vinylene group, the benzene rings being optionally substituted by halogen atoms or by alkyl, phenyl, alkoxy, phenoxy, haloalkyl groups, a nitrile group, a nitro group, a vinyl group, or an alkenyl, carboxylic or sulphonic group, and wherein R is selected from the group consisting of hydrogen, alkyl radicals and the phenyl radical.

2. An elastomeric polymer according to claim 1, in which the sum ($n + m$) is a number from 15 to 100.

3. An elastomeric polymer according to claim 1, in which the polydispersity index defined by the $\overline{M}w/\overline{M}n$ ratio, wherein $\overline{M}w$ is the average weight molecular weight of the perfluoropolyether segment and $\overline{M}n$ is the average number molecular weight of the perfluoropolyether segment, is from 1 to 1.3.

4. An elastomeric polymer according to the claim 2, vulcanized with an organic peroxide at temperatures ranging from 70° to 200°C.

5. A process for preparing the elastomeric polymers according to claim 1 which comprises polycondensing a polyoxaperfluoroalkandioic acid derivative selected from the group consisting of methyl diesters, phenyl diesters and acid chlorides the corresponding acid of which has the formula HOOC—$CF_2O$ $(C_2F_4O)_m$ —($CF_2O)_n$ —$CF_2$—COOH, wherein the $n/m$ ratio is from 0.2 to 1.5 with a diamine selected from the group consisting of aliphatic diamines containing from 6 to 12 carbon atoms, heterocyclic diamines selected from the group consisting of 3,5 diamino-1,2,4 triazole and 6-phenyl-1,2,4-diamino-1,3,5-triazine, alicyclic diamines containing 5 to 10 carbon atoms and aromatic diamines in an amount of acid derivative to diamine of from 0.4 to 1.1, at a temperature ranging from the room temperature to 280°C.

6. A process according to claim 5, in which the acid chloride of a polyoxaperfluoroalkandioic acid is polycondensed with the diamine in a solution of organic solvents mixtures.

7. A process according to claim 6, in which the polycondensation is conducted in the presence of tertiary nitrogen bases or in an excess of said diamine.

8. A process according to claim 5, in which the diamine is selected from the group consisting of 1,2-ethane diamine; 1,3-propane diamine; 1,4-butane diamine; 1,5-pentane diamine; 1,6-hexane diamine; 1,12-dodecane diamine; N,N'-dimethyl-1,6-hexane diamine;

1,3-benzene diamine; 1,4-benzene diamine; 2-chloro-1,4-benzene diamine; 2,6-dichloro-1,4-benzene diamine; 2-nitro-1,4-benzene diamine; 6-methoxy-1,3-benzene diamine; 6-chloro-1,3-benzene diamine; 2,4-toluene diamine; 2,6-toluene diamine; benzidine; 3,3'-dimethyl benzidine; 3,3'-dichlorobenzidine; 4,4'-oxydianiline; 4,4'-methylene-bis(2-chloroaniline); 4,4'-methylene dianiline; 4,4'-sulphonyldianiline; 4,4'-sulphinyldianiline; 3,3'-sulphonyldianiline; 3,5-diaminobenzoic acid; 4,4'-ethylene dianiline; 3,5-diamino-1,2,4-triazole; 6-phenyl-2,4-diamino-1,3,5-triazine; 4,4'-diamino-benzophenone; 1,3-xylene-α,α'-diamine; 1-amino-3-aminomethyl-3,5,5-trimethylcyclohexane; 1,4-bis(aminomethyl)cyclohexane; 4,4'-phenylenedioxydianiline; 4,4'-iminodianiline.

9. A process according to claim 6, in which the polycondensation is carried out in the presence of multifunctional compounds having more than two functions, used in an amount of up to 30% in number with respect to the bifunctional units, and selected from the group consisting of alkyl and phenyl fumaric acid esters, 3,5-diaminobenzoic, 3,5-diaminosulphonic, pyromellitic, benzophenonetetracarboxylic, and trimetallitic acids, 1,3,5-benzenetriamine, 4,4'-stilbendiamine and cyclohexenylendicarboxylic acid.

10. A process according to claim 6, in which the polycondensation is carried out in the presence of an organic solvent or dispersing agent selected from the group consisting of 1,1,2-trichlorotrifluoroethane, perfluoropropylpyran, methanol, tetrahydrofuran, dioxane, N,N-dimethylformamide, N,N-dimethylacetamide, aromatic hydrocarbons and their alkyl derivatives.

11. A process according to claim 7, in which, after polycondensation, the cross-linking is carried out with an organic peroxide or an organic bifunctional compound of basic nature, consisting of 2,4-toluenediamine.

12. Vulcanized formed articles obtained by molding the polymers according to claim 2.

13. The process according to claim 5 in which the polyoxaperfluoroalkandioic acid derivative is polycondensed with the diamine at a temperature of 20° to 250°C.

* * * * *

UNITED STATES PATENT OFFICE
CERTIFICATE OF CORRECTION

PATENT NO. : 3,876,617

DATED : Issue April 8, 1974

INVENTOR(S) : Gerardo Caporiccio, et al

It is certified that error appears in the above-identified patent and that said Letters Patent are hereby corrected as shown below:

The issue date (April 8, 1974) given on the face of the patent is incorrect. The correct issue date is

APRIL 8, 1975.

Signed and sealed this 27th day of May 1975.

(SEAL)
Attest:

RUTH C. MASON
Attesting Officer

C. MARSHALL DANN
Commissioner of Patents
and Trademarks